United States Patent

Pawar et al.

(10) Patent No.: US 11,055,005 B2
(45) Date of Patent: Jul. 6, 2021

(54) BACKGROUND DEDUPLICATION USING TRUSTED FINGERPRINTS

(71) Applicant: NetApp Inc., Sunnyvale, CA (US)

(72) Inventors: Dnyaneshwar Nagorao Pawar, Bangalore (IN); Kartik Rathnakar, Karnataka (IN)

(73) Assignee: NetApp, Inc., San Jose, CA (US)

( * ) Notice: Subject to any disclaimer, the term of this patent is extended or adjusted under 35 U.S.C. 154(b) by 169 days.

(21) Appl. No.: 16/254,741

(22) Filed: Jan. 23, 2019

(65) Prior Publication Data

US 2020/0117379 A1 Apr. 16, 2020

(30) Foreign Application Priority Data

Oct. 12, 2018 (IN) .............................. 201841038863

(51) Int. Cl.
*G06F 3/06* (2006.01)

(52) U.S. Cl.
CPC .......... *G06F 3/0641* (2013.01); *G06F 3/0608* (2013.01); *G06F 3/0673* (2013.01)

(58) Field of Classification Search
CPC .. G06F 3/0608; G06F 3/0641; G06F 16/1748; G06F 11/1453; G06F 3/0671; G06F 3/0673; G06F 21/6218; G06F 3/0484
See application file for complete search history.

(56) References Cited

U.S. PATENT DOCUMENTS

| | | |
|---|---|---|
| 7,567,188 B1 | 7/2009 | Anglin et al. |
| 8,370,315 B1 | 2/2013 | Efstathopoulos et al. |
| 8,620,877 B2 | 12/2013 | Smith |
| 9,152,333 B1 | 10/2015 | Johnston et al. |
| 9,177,028 B2 | 11/2015 | Chambliss et al. |
| 9,256,378 B2* | 2/2016 | Zheng ................... G06F 3/0683 |
| 9,292,530 B2 | 3/2016 | Nag Yasa et al. |
| 9,430,164 B1 | 8/2016 | Botelho et al. |
| 9,760,578 B2 | 9/2017 | Caro et al. |
| 9,766,832 B2 | 9/2017 | Trimble et al. |
| 9,811,551 B1 | 11/2017 | Colgrove et al. |
| 2008/0005141 A1 | 1/2008 | Zheng et al. |
| 2010/0042790 A1* | 2/2010 | Mondal ................. G06F 3/0641 |
| | | 711/161 |
| 2010/0121825 A1 | 5/2010 | Bates et al. |
| 2014/0358871 A1 | 12/2014 | Cideciyan et al. |
| 2015/0106345 A1 | 4/2015 | Trimble et al. |
| 2015/0302022 A1 | 10/2015 | Gu et al. |
| 2016/0378355 A1 | 12/2016 | Muthukkaruppan et al. |

FOREIGN PATENT DOCUMENTS

| | | |
|---|---|---|
| CN | 102831222 A | 12/2012 |
| CN | 107430602 A | 12/2017 |

* cited by examiner

*Primary Examiner* — Zhuo H Li

(74) *Attorney, Agent, or Firm* — Cooper Legal Group, LLC

(57) ABSTRACT

Techniques are provided for background deduplication using trusted fingerprints. Trusted fingerprints of blocks are inserted into a trusted fingerprint store as the blocks are being allocated by a file system sequentially according to block numbers of the blocks. In this way, the trusted fingerprint store is indexed by block numbers of where the blocks are stored. Blocks that are to be deduplicated are identifying by sorting the blocks based upon weak fingerprints, and moving duplicates to a dup file. The dup file is sorted based upon block numbers. Trusted fingerprints are loaded from the trusted fingerprint store for deduplicating the blocks within the dup file.

20 Claims, 6 Drawing Sheets

BACKGROUND DEDUPLICATION USING TRUSTED FINGERPRINTS

RELATED APPLICATIONS

This application claims priority to India Provisional Patent Application, titled "BACKGROUND DEDUPLICATION USING TRUSTED FINGERPRINTS", filed on Oct. 12, 2018 and accorded Application No.: 201841038863, which is incorporated herein by reference.

BACKGROUND

Many storage systems implement deduplication to eliminate duplicate copies of the same data in order to improve storage efficiency. Instead of storing multiple redundant copies of the same data, a single copy of the data is stored once and pointers to that single copy are used instead of storing additional redundant copies of the data. One type of deduplication is inline deduplication that ensures blocks are deduplicated before being written to a storage device. Inline deduplication uses an incore hash store that maps weak fingerprints to duplicate blocks. The key to this hash is a weak fingerprint that points to duplicate block data. Whenever data is to be written to a storage device, a fingerprint of that data is calculated and the hash store is looked up using the fingerprint to find duplicates. If duplicate data is found, then the duplicate data is loaded from disk and a whole block byte by byte comparison is performed to ensure that the duplicate data is an actual duplicate of the data to be written to the storage device. If the data to be written is a duplicate of the loaded duplicate data, then the data to be written to disk is not redundantly stored to the storage device. Instead, a pointer is stored in the storage device in place of the data to be written to the storage device. The pointer points to the duplicate data already stored in the storage device. In this way, inline deduplication is able to deduplicate data before the data is written to disk, but increases latency of write operations (e.g., inline deduplication must complete before a write operation is able to finish).

Background deduplication is another type of deduplication that deduplicates data already written to the storage device. Background deduplication utilizes a changelog to track blocks that are written to the storage device and not inline deduplicated. Background deduplication also maintains fingerprint database (e.g., a flat metafile) that tracks all unique block data like its fingerprint and other filesystem metadata. Background deduplication is automatically triggered when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate the block, duplicate records in the dup file are sorted in certain filesystem sematic order (e.g., inode number and block number) which will ensure metadata loading required is optimized for next step. Next, the duplicate data is loaded from the storage device and a whole block byte by byte comparison is performed to make sure duplicate data is an actual duplicate of the data to be written to the storage device. After, the block in the changelog is modified to point directly to the duplicate data.

Unfortunately, both inline deduplication and background deduplication must load potentially duplicate data from the storage device in order to perform the whole block byte by byte comparison. This is because weak fingerprints are used, and thus the whole block byte by byte comparison is performed to ensure that data is in fact duplicate. Loading the potentially duplicate data from the storage device, which consumes time and computing resources.

DETAILED DESCRIPTION

Figure 1:
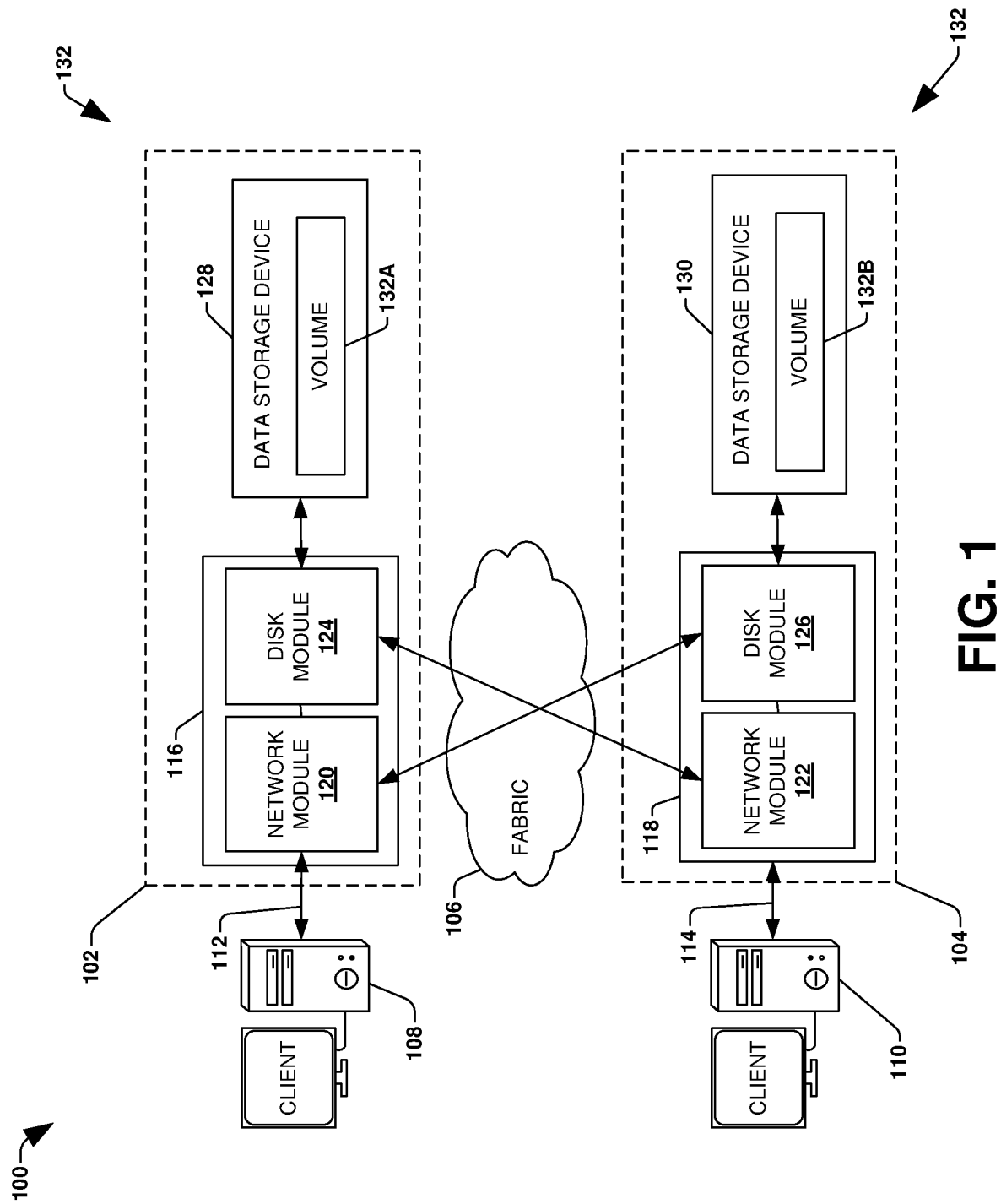
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

Conventional deduplication engines use weak fingerprints to identify duplicate data. Because the fingerprints are weak, collisions can occur where potentially duplicate data must be loaded from a storage device so that whole block byte by byte comparison can be performed to ensure that the duplicate data is actually duplicate. Unfortunately, deduplication throughput is bottlenecked because the block must be loaded from the storage device (e.g., loaded from disk). Latency incurred from loaded the block from the storage device is a huge performance cost that significantly hinders the performance of deduplication.

In high ingest rate storage systems, write operations can occur at a fast rate. In such systems, there is a requirement to be able to provision storage space for these write operations being received at the fast rate by provisioning storage space as early as possible. Inline deduplication could be used to ensure storage space is provisioned as early as possible. However, inline deduplication cannot scale because it is time-bound and must complete before data is written to storage. Another limitation is that inline deduplication uses an in-core fingerprint store that cannot store all the needed fingerprints in memory due to memory size limitations. Other solutions utilize hash stores that are indexed based on fingerprints. Insert and lookup operations to such a hash store will be random because fingerprints are generally random as opposed to sequential. Random insert and lookup operations result in a huge performance cost. Also, background deduplication is not fast enough to free up storage space for incoming write operations of high ingest rate storage systems because blocks must be loaded from storage due to the use of weak fingerprints, which lowers deduplication throughput.

Accordingly, methods and/or systems are provided herein that improve deduplication throughput by using strong trusted fingerprints such as SHA512/SHA256 and/or any other cryptographic hash algorithms and by using a trusted fingerprint store that is sequentially indexed by block numbers. By using strong trusted fingerprints, blocks do not have to be loaded from storage because there is no need to perform a whole byte by byte comparison between two potentially duplicate blocks from a storage device. Because there is no need to load blocks from the storage device and perform a whole byte by byte comparison, deduplication throughput is greatly improved. The trusted fingerprints are stored within the trusted fingerprint store (e.g., a metafile).

The trusted fingerprint store is indexed by block numbers at which blocks reside (e.g., a virtual block number (VBN)) as opposed to being indexed by fingerprints. In particular, when a file system allocates blocks, the blocks are usually allocated sequentially with sequential block numbers. For example, when a first block is written to storage, the first block is assigned a first virtual block number, the next block will be sequentially assigned a second virtual block number, etc. Because trusted fingerprints for blocks are inserted into the trusted fingerprint store as block are allocated, the trusted fingerprints are stored sequentially by block number within the trusted fingerprint store. This means that most insert and lookup operations to the trusted fingerprint store are sequential instead of random, which greatly improves performance of such operations. For example, because the trusted fingerprints are stored sequentially, a single load operation of sequential trusted fingerprints can be used for deduplicating a plurality of blocks, such as 64 blocks, instead of performing a load operation for each block.

Improving deduplication performance and throughput allows for storage space to be freed quicker. The ability to more quickly free storage space allows for such storage space to be quickly provisioned for storing data of incoming write operations. This improves the ability of a high ingest rate storage system to create adequate storage space to use for provisioning and storing data being written at a high ingest rate.

To provide for background deduplication using trusted fingerprints, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that background deduplication using trusted fingerprints may be implemented within the clustered network environment 100. In an example, operations may be executed at node 116 and replayed at node 118. It may be appreciated that background deduplication using trusted fingerprints may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
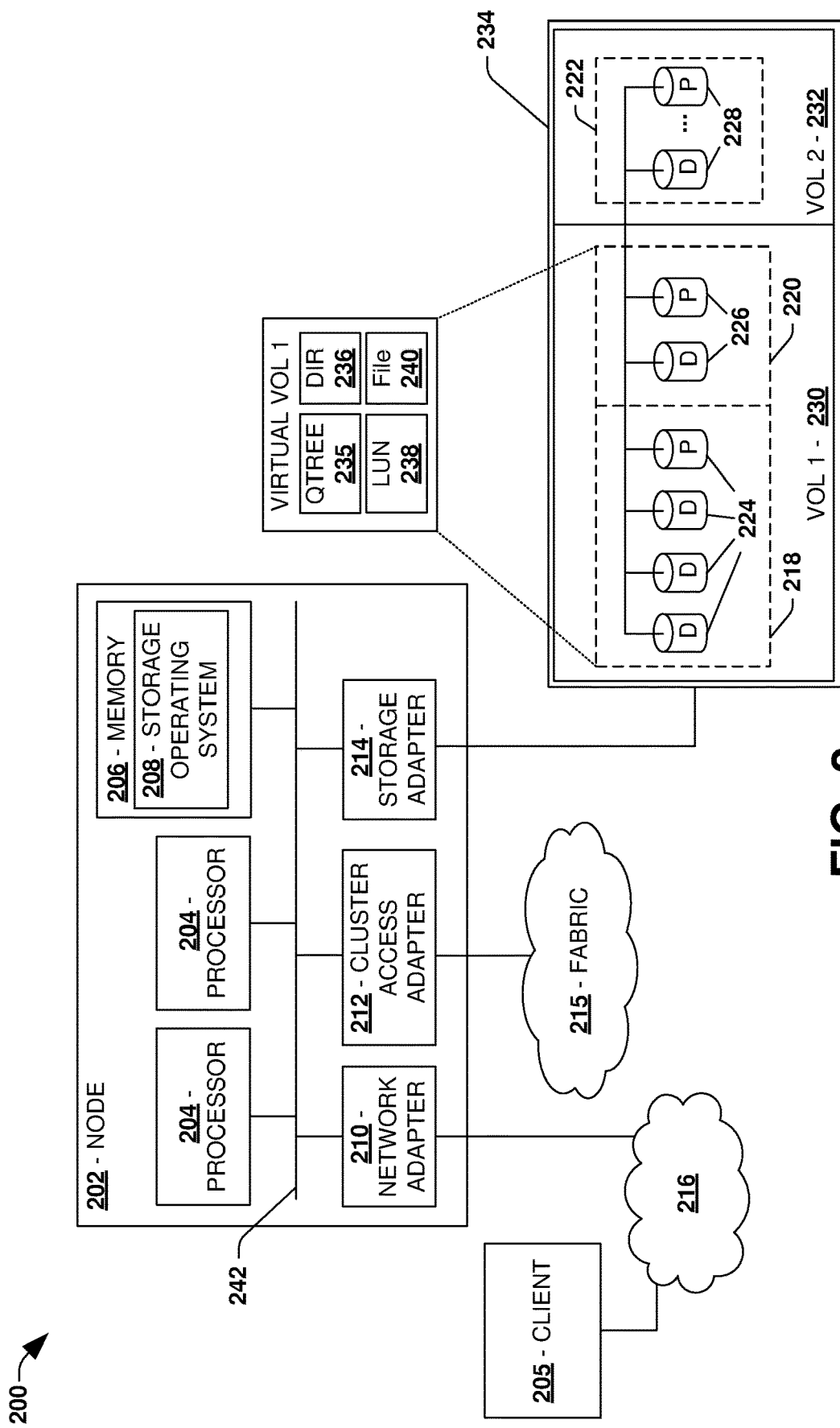
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that background deduplication using trusted fingerprints may be implemented for the data storage system 200. It may be appreciated that background deduplication using trusted fingerprints may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 4:
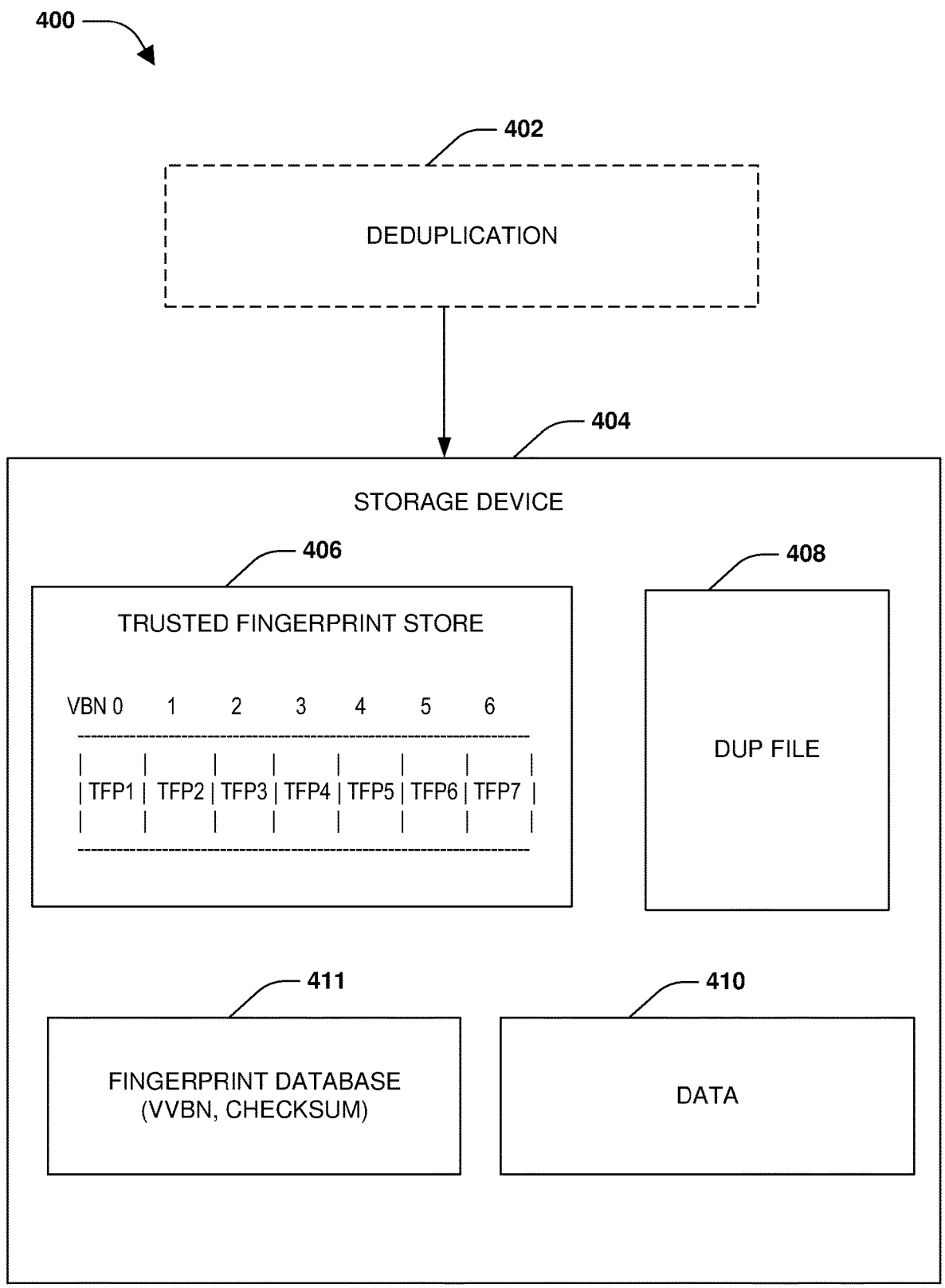
FIG. 4 is a component block diagram illustrating an example system for background deduplication using trusted fingerprints and a trusted fingerprint store sequentially indexed by block numbers.

One embodiment of background deduplication using trusted fingerprints and a trusted fingerprint store sequentially indexed by block numbers is illustrated by an exemplary method 300 of FIG. 4 and further described in conjunction with system 400 of FIG. 4. Data 410, such as user data and metadata, maintained by a storage system is stored within a storage device 404. In one example, the storage system has a high ingest rate of write operations that require storage to be provisioned within the storage device 404 as early as possible to free up storage for processing the write operations. Accordingly, deduplication 402 is performed upon the storage device 404 using trusted fingerprints that are sequentially sorted by block number so that sequential insert and lookup operations can be performed in an efficient and performant manner upon a trusted fingerprint store 406.

At 302, trusted fingerprints of blocks (e.g., fingerprints calculated using SHA512 and/or SHA256 hashes and/or any other cryptographic hash algorithms) are inserted into a trusted fingerprint store 406, such as a metafile or other data structure, as the blocks are being allocated by a file system for storing the data 410 in the storage device 404. That is, when a block is being allocated by the file system at a particular block number such as a virtual block number, a trusted fingerprint of that block is calculated, such as by using SHA512 and/or SHA256 hashes or any other technique. The trusted fingerprint is stored as an entry within the trusted fingerprint store 406. The block number of the block may be inferred based upon an offset of where the trusted fingerprint is stored.

Because the file system allocates blocks sequentially according to block numbers, the trusted fingerprints are sequentially stored within the trusted fingerprint store 406 according to the block numbers. For example, a first trusted fingerprint of a first block stored at a first block number within the storage device 404 is stored first within the trusted fingerprint store 406. A second trusted fingerprint of a second block stored at a second block number within the storage device 404 is stored second within the trusted fingerprint store 406. In this way, the trusted fingerprint store 406 is indexed based upon the block numbers that point to locations at which the block are sequentially stored within the storage device 404. The trusted fingerprint store 406 may be stored within the storage device 404 because the storage device 404 has available storage resources for storing all of the trusted fingerprints, whereas memory may not. Because trusted fingerprints of blocks are inserted as the blocks are being sequentially allocated according to block number by the file system, insert operations to insert the trusted fingerprints into the trusted fingerprint store 406 are performed sequentially, and thus are executed more quickly and efficiently than if randomly performed (e.g., inserting/sorting by fingerprints instead of sequential block numbers will result in slower and less performant random inserts and reads because fingerprints are not sequential but are generally random).

The trusted fingerprint store 406 is maintained and updated as data is written, modified, and/or overwritten within the storage device 404 so that the trusted fingerprint store 406 is kept up to date and represents a latest state of current data within the storage device 404 for deduplication 402. In this way, deduplication 402 can rely upon the trusted fingerprint store 406 as representing correct data at any given point in time. When the data 410 within the storage device 404 is modified, such as by an overwrite operation, the trusted fingerprint store 406 is updated. For example, a write operation overwrites old data of a block with new data. A new trusted fingerprint of the new data is generated. An entry within the trusted fingerprint store 406, mapping an old fingerprint to a block number of the block, is updated to map the block number to the new trusted fingerprint of the new data now stored within the block. In this way, the trusted fingerprint store 406 will represent correct data at any given point in time so that data corruption does not occur.

At 304, blocks to be deduplicated are sorted based upon fingerprints to identify duplicate blocks that are moved into a dup file 408. For example, a change log is used to track blocks that are written to the storage device 404 and were not inline deduplicated. Deduplication 402 may be triggered when the change log is filled past a certain threshold. The data within the change log and/or records within a fingerprint data database 411 is sorted based upon fingerprints (e.g., weak fingerprints, such as weak checksums stored within the fingerprint database 411) to ensure that duplicate blocks are sorted next to one another. These deduplicate blocks are identified within the sorted change log, and are then moved into the dup file 408. The remaining unique entries (non-duplicate blocks) may be moved into the fingerprint data database 411 to serve as potential duplicate data for a next deduplication operation. In this way, duplicate blocks are identified by sorting based upon fingerprints, and the duplicate blocks are tracked as records within the dup file 408.

At 306, the records within the dup file 408 are sorted based upon block numbers. In an example, the records are sorted in a particular filesystem semantic order, such as by inode number and block number within inodes of the blocks. At this point the records within the dup file 408 are sequentially indexed based upon block numbers as are the trusted fingerprints within the trusted fingerprint store 406.

Instead of loading complete blocks from the storage device 404 to perform the deduplication 402, corresponding trusted fingerprints are loaded from the trusted fingerprint store 406 to compare with the blocks within the dup file 408 to identify actual duplicates, at 308. Prior techniques could merely load a single full block (e.g., a potential duplicate block) per share, and a whole byte by byte comparison would have to be performed between blocks. However, as provided herein, a full block of trusted fingerprints are loaded from the trusted fingerprint store 406 into memory for deduplication 402.

In one example, the file system stores data within 4 kb blocks. A single trusted fingerprint may comprise 64 bytes of information. Thus, a single load operation from the trusted fingerprint store 406 will load about 64 fingerprints. In this way, the next 64 blocks participating in the sharing (e.g., blocks within the dup file 408 being verified as actual duplicates) will just use the already loaded trusted fingerprint data. This will save about 64 disk access operations to the storage device 404, which greatly improves the throughput of the deduplication 402 when compared to conventional deduplication technique that must load each complete block (e.g., potentially duplicate block already stored in the storage device 404) using single disk access operations for each individual block in order to perform a full block byte by byte comparison between the loaded block and a block within the dup file 408. This is because the trusted fingerprints within the trusted fingerprint store 406 and the blocks within the dup file 408 are indexed/sorted by mostly sequential block numbers. At 310, the blocks tracked within the dup file 408 are deduplicated 402 by comparing trusted fingerprints (e.g., loaded from the trusted fingerprint store 406) of identified duplicate blocks.

Figure 3:
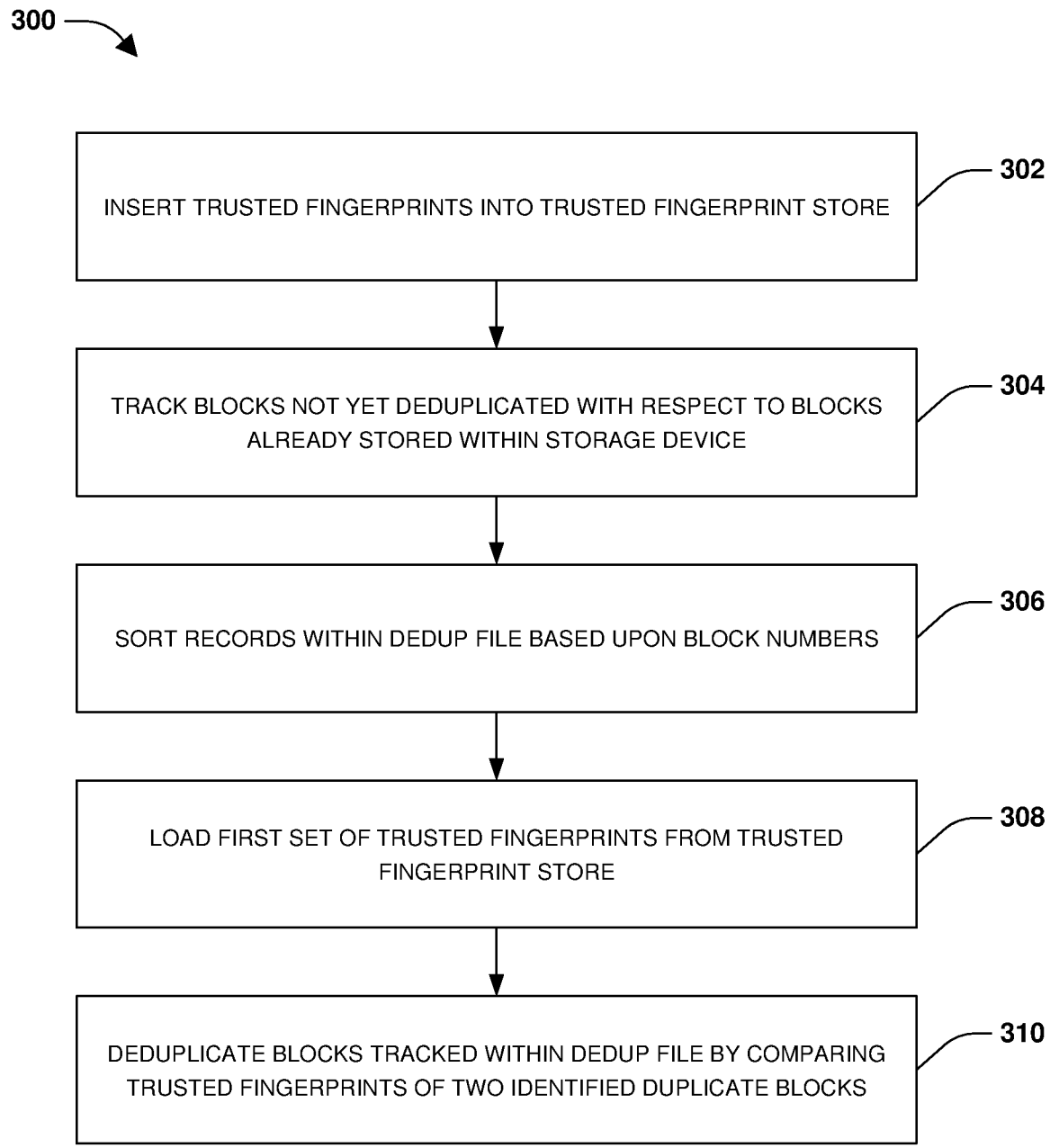
FIG. 3 is a flow chart illustrating an example method for background deduplication using trusted fingerprints and a trusted fingerprint store sequentially indexed by block numbers.
Figure 5:
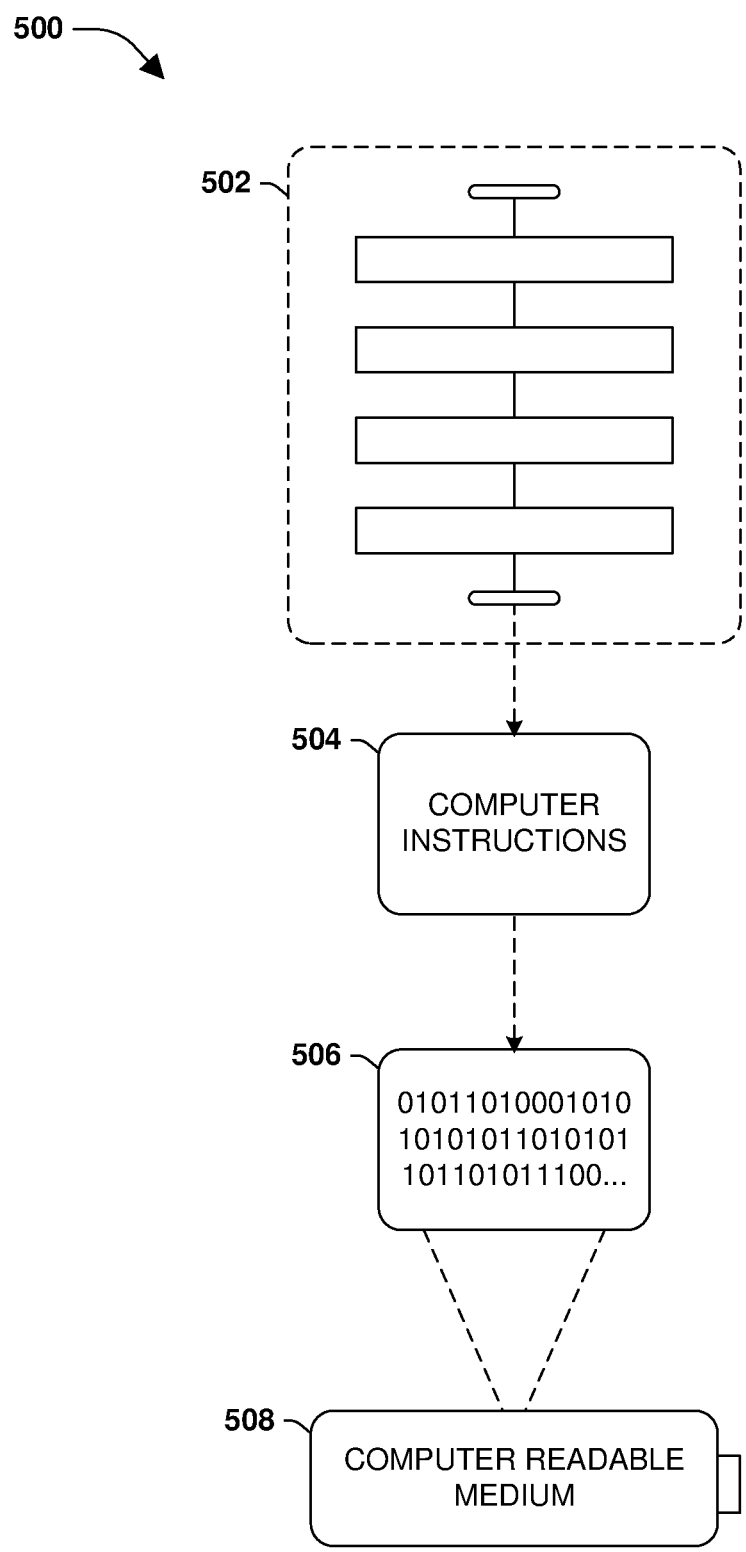
FIG. 5 is an example of a computer readable medium in which an embodiment of the invention may be implemented.

Still another embodiment involves a computer-readable medium 500 comprising processor-executable instructions configured to implement one or more of the techniques presented herein. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIG. 4, for example. Many such computer-readable media are contemplated to operate in accordance with the techniques presented herein.

Figure 6:
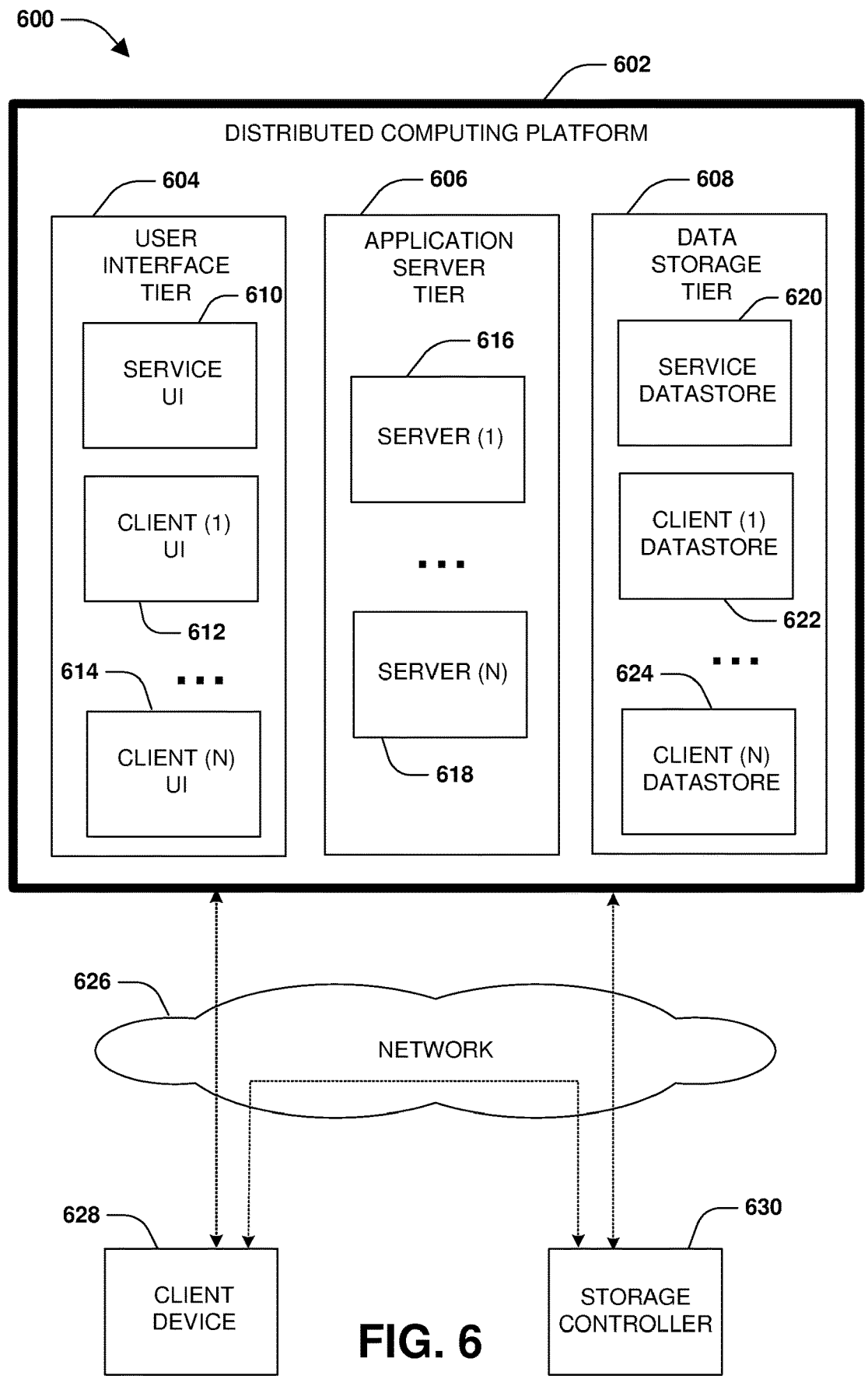
FIG. 6 is a component block diagram illustrating an example computing environment in which an embodiment of the invention may be implemented.

FIG. 6 is a diagram illustrating an example operating environment 600 in which an embodiment of the techniques described herein may be implemented. In one example, the techniques described herein may be implemented within a client device 628, such as a laptop, tablet, personal computer, mobile device, wearable device, etc. In another example, the techniques described herein may be implemented within a storage controller 630, such as a node configured to manage the storage and access to data on behalf of the client device 628 and/or other client devices. In another example, the techniques described herein may be implemented within a distributed computing platform 602 such as a cloud computing environment (e.g., a cloud storage environment, a multi-tenant platform, etc.) configured to manage the storage and access to data on behalf of the client device 628 and/or other client devices.

In yet another example, at least some of the techniques described herein are implemented across one or more of the client device 628, the storage controller 630, and the distributed computing platform 602. For example, the client device 628 may transmit operations, such as data operations to read data and write data and metadata operations (e.g., a create file operation, a rename directory operation, a resize operation, a set attribute operation, etc.), over a network 626 to the storage controller 630 for implementation by the storage controller 630 upon storage. The storage controller 630 may store data associated with the operations within volumes or other data objects/structures hosted within locally attached storage, remote storage hosted by other computing devices accessible over the network 626, storage provided by the distributed computing platform 602, etc. The storage controller 630 may replicate the data and/or the operations to other computing devices so that one or more replicas, such as a destination storage volume that is maintained as a replica of a source storage volume, are maintained. Such replicas can be used for disaster recovery and failover.

The storage controller 630 may store the data or a portion thereof within storage hosted by the distributed computing platform 602 by transmitting the data to the distributed computing platform 602. In one example, the storage controller 630 may locally store frequently accessed data within locally attached storage. Less frequently accessed data may be transmitted to the distributed computing platform 602 for storage within a data storage tier 608. The data storage tier 608 may store data within a service data store 620, and may store client specific data within client data stores assigned to such clients such as a client (1) data store 622 used to store data of a client (1) and a client (N) data store 624 used to store data of a client (N). The data stores may be physical storage devices or may be defined as logical storage, such as a virtual volume, LUNs, or other logical organizations of data that can be defined across one or more physical storage devices. In another example, the storage controller 630 transmits and stores all client data to the distributed computing platform 602. In yet another example, the client device 628 transmits and stores the data directly to the distributed computing platform 602 without the use of the storage controller 630.

The management of storage and access to data can be performed by one or more storage virtual machines (SMVs) or other storage applications that provide software as a service (SaaS) such as storage software services. In one example, an SVM may be hosted within the client device 628, within the storage controller 630, or within the distributed computing platform 602 such as by the application server tier 606. In another example, one or more SVMs may be hosted across one or more of the client device 628, the storage controller 630, and the distributed computing platform 602.

In one example of the distributed computing platform 602, one or more SVMs may be hosted by the application server tier 606. For example, a server (1) 616 is configured to host SVMs used to execute applications such as storage applications that manage the storage of data of the client (1) within the client (1) data store 622. Thus, an SVM executing on the server (1) 616 may receive data and/or operations from the client device 628 and/or the storage controller 630 over the network 626. The SVM executes a storage application to process the operations and/or store the data within the client (1) data store 622. The SVM may transmit a response back to the client device 628 and/or the storage controller 630 over the network 626, such as a success message or an error message. In this way, the application server tier 606 may host SVMs, services, and/or other storage applications using the server (1) 616, the server (N) 618, etc.

A user interface tier 604 of the distributed computing platform 602 may provide the client device 628 and/or the storage controller 630 with access to user interfaces associated with the storage and access of data and/or other services provided by the distributed computing platform 602. In an example, a service user interface 610 may be accessible from the distributed computing platform 602 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 612, a client (N) user interface 614, etc. The client (1) can access various services and resources subscribed to by the client (1) through the client (1) user interface 612, such as access to a web service, a development environment, a human resource application, a warehouse tracking application, and/or other services and resources provided by the application server tier 606, which may use data stored within the data storage tier 608.

The client device 628 and/or the storage controller 630 may subscribe to certain types and amounts of services and resources provided by the distributed computing platform 602. For example, the client device 628 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 630 can establish a subscription to have access to certain services and resources of the distributed computing platform 602.

As shown, a variety of clients, such as the client device 628 and the storage controller 630, incorporating and/or incorporated into a variety of computing devices may communicate with the distributed computing platform 602 through one or more networks, such as the network 626. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 602, such as a multi-tenant business data processing platform or cloud computing environment, may include multiple processing tiers, including the user interface tier 604, the application server tier 606, and a data storage tier 608. The user interface tier 604 may maintain multiple user interfaces, including graphical user interfaces and/or web-based interfaces. The user interfaces may include the service user interface 610 for a service to provide access to applications and data for a client (e.g., a "tenant") of the service, as well as one or more user interfaces that have been specialized/customized in accordance with user specific requirements, which may be accessed via one or more APIs.

The service user interface 610 may include components enabling a tenant to administer the tenant's participation in the functions and capabilities provided by the distributed computing platform 602, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 608 may include one or more data stores, which may include the service data store 620 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 602 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    inserting trusted fingerprints of blocks into a trusted fingerprint store as the blocks are being allocated by a file system sequentially according to block numbers of the blocks, wherein the trusted fingerprints are inserted into the trusted fingerprint store sequentially indexed by block numbers corresponding to a sequence of the file system sequentially allocating the blocks according to the block numbers;
    sorting blocks to be deduplicated within a storage device based upon fingerprints to identify duplicate blocks that are moved into a dup file, wherein the blocks are tracked as records within the dup file;

sorting the records within the dup file based upon block numbers;

loading a first set of trusted fingerprints from the trusted fingerprint store; and deduplicating blocks tracked within the dup file by comparing trusted fingerprints of two identified duplicate blocks.

2. The method of claim 1, comprising:

indexing the trusted fingerprint store based upon the block numbers pointing to locations at which the blocks are stored within the storage device.

3. The method of claim 1, wherein the inserting comprises:

inserting the trusted fingerprints sequentially into the trusted fingerprint store based upon sequential block numbers of corresponding blocks.

4. The method of claim 1, comprising:

storing the trusted fingerprint store within the storage device.

5. The method of claim 1, comprising:

updating the trusted fingerprint store for a block using a new trusted fingerprint for the block based upon the block being overwritten.

6. The method of claim 1, wherein the sorting the records comprises:

sorting the records based upon weak fingerprints.

7. The method of claim 1, wherein the deduplicating comprises:

performing the deduplication without loading the blocks already stored within the storage device.

8. The method of claim 1, wherein the loading comprises:

performing a single load operation to load a plurality of trusted fingerprints as the set of trusted fingerprints.

9. The method of claim 8, wherein the first set of fingerprints are sequentially ordered according to block numbers based upon the dup file being sorted based upon block numbers.

10. The method of claim 8, wherein the plurality of trusted fingerprints are sequentially ordered according to block numbers.

11. A non-transitory machine readable medium comprising instructions for performing a method, which when executed by a machine, causes the machine to:

insert trusted fingerprints of blocks into a trusted fingerprint store as the blocks are being allocated by a file system sequentially according to block numbers of the blocks, wherein the trusted fingerprints are inserted into the trusted fingerprint store sequentially indexed by block numbers corresponding to a sequence of the file system sequentially allocating the blocks according to the block numbers;

sort blocks to be deduplicated within a storage device based upon fingerprints to identify duplicate blocks that are moved into a dup file, wherein the blocks are tracked as records within the dup file;

sort the records within the dup file based upon block numbers;

load a first set of trusted fingerprints from the trusted fingerprint store; and deduplicate blocks tracked within the dup file by comparing trusted fingerprints of two identified duplicate blocks.

12. The non-transitory machine readable medium of claim 11, wherein the instructions cause the machine to:

index the trusted fingerprint store based upon the block numbers pointing to locations at which the blocks are stored within the storage device.

13. The non-transitory machine readable medium of claim 11, wherein the instructions cause the machine to:

insert the trusted fingerprints sequentially into the trusted fingerprint store based upon sequential block numbers of corresponding blocks.

14. The non-transitory machine readable medium of claim 11, wherein the instructions cause the machine to:

store the trusted fingerprint store within the storage device.

15. The non-transitory machine readable medium of claim 11, wherein the instructions cause the machine to:

update the trusted fingerprint store for a block using a new trusted fingerprint for the block based upon the block being overwritten.

16. The non-transitory machine readable medium of claim 11, wherein the instructions cause the machine to:

sort the records based upon weak fingerprints.

17. A computing device comprising:

a memory having stored thereon instructions for performing a method; and a processor coupled to the memory, the processor configured to execute the instructions to cause the processor to:

insert trusted fingerprints of blocks into a trusted fingerprint store as the blocks are being allocated by a file system sequentially according to block numbers of the blocks, wherein the trusted fingerprints are inserted into the trusted fingerprint store sequentially indexed by block numbers corresponding to a sequence of the file system sequentially allocating the blocks according to the block numbers;

sort blocks to be deduplicated within a storage device based upon fingerprints to identify duplicate blocks that are moved into a dup file, wherein the blocks are tracked as records within the dup file;

sort the records within the dup file based upon block numbers;

load a first set of trusted fingerprints from the trusted fingerprint store; and deduplicate blocks tracked within the dup file by comparing trusted fingerprints of two identified duplicate blocks.

18. The computing device of claim 17, wherein the instructions cause the processor to:

perform a single load operation to load a plurality of trusted fingerprints as the set of trusted fingerprints, wherein the plurality of trusted fingerprints are sequentially ordered according to block numbers.

19. The computing device of claim 18, wherein the first set of fingerprints are sequentially ordered according to block numbers based upon the dup file being sorted based upon block numbers.

20. The computing device of claim 19, wherein the deduplicating is performed between fingerprints from the first set of fingerprints and trusted fingerprints from the set of trusted fingerprints sequentially according to block numbers.

* * * * *